United States Patent [19]

Campana

[11] 4,292,726
[45] Oct. 6, 1981

[54] INGOT MOLD RECONDITIONING PROCESS

[76] Inventor: Patsie C. Campana, 2614 Sherwood Dr., Lorain, Ohio 44053

[21] Appl. No.: 116,170

[22] Filed: Jan. 28, 1980

[51] Int. Cl.³ .............................................. B23P 6/00
[52] U.S. Cl. .............................. 29/527.6; 29/402.19; 164/1; 249/174
[58] Field of Search .......................... 164/1, 76, 121; 249/174, 102; 29/402.06, 402.07, 402.19, 527.6

[56] References Cited

U.S. PATENT DOCUMENTS

| | | | |
|---|---|---|---|
| 1,881,088 | 10/1932 | Matuschka | 249/102 X |
| 2,437,626 | 3/1948 | Tinsley | 29/402.19 X |
| 2,499,292 | 2/1950 | Black | 29/527.6 |
| 2,761,201 | 9/1956 | Sylvester | 29/402.06 |
| 3,191,292 | 6/1965 | Strom | 29/527.6 |
| 3,201,213 | 8/1965 | Werner | 29/527.6 X |
| 3,593,406 | 7/1971 | Jones, Jr. et al. | 29/402.19 X |

Primary Examiner—Robert D. Baldwin
Assistant Examiner—J. Reed Batten, Jr.
Attorney, Agent, or Firm—Fay & Sharpe

[57] ABSTRACT

A process for reconditioning an ingot mold of the type including an elongated cavity area having some predetermined volume and at least one open end for purposes of extending the useful life thereof. In accordance with the reconditioning process, a short portion of the mold length is cut-off or machined away at a mold cavity open end to eliminate the usual mold damage which typically occurs at that area after a number of separate casts. The cut-off is effected so that the mold cavity will have some new volume comprising some predetermined reduction of the original volume. This second volume is calculated such that ingots then cast from the reconditioned mold and thereafter processed may be cut into a lesser number of bars having substantially the same size and volume characteristics as those bars cut from ingots cast in the original mold. In some cases, it may be desirable to also machine at least the mold cavity side walls so that the original surface conditions and dimensional relationships are substantially assumed.

7 Claims, 4 Drawing Figures

4,292,726

INGOT MOLD RECONDITIONING PROCESS

BACKGROUND OF THE INVENTION

This invention pertains to the art of casting and more particularly to casting molten steel into ingots.

The invention is particularly applicable to a process for reconditioning a steel ingot mold for extending its useful life and will be described with particular reference thereto. However, it will be appreciated by those skilled in the art that the invention has broader applications and may be readily adapted to use in other environments.

In the production of steel, the molten metal is poured or cast from the furnace into so-called ingot molds. These molds are quite large in size and form quite large, somewhat rectangular steel ingots. Each ingot thus formed is removed from the mold and then conventionally processed as by means of rolling through a plurality of rolling mills, soaking mills and the like until the ingot has been shaped or worked into some desired configuration having particular dimensional characteristics. Thereafter, the shaped or worked ingot is typically cut into a plurality of smaller bars each having the same dimensional and volume characteristics. The volume of the cast ingot is calculated so that there is very little scrap generated when the worked ingot is cut into bars. These bars may then be further processed for ultimate use in manufacturing steel products and the like.

As noted above, the ingot molds themselves are quite large and are reuseable to accommodate a plurality of ingot casts. However, each cast has a deleterious affect on the mold which has heretofore limited the effective mold life. Typically, and following a normal pattern of mold usage, the mold will begin to round out and cause cracks or bottom fins. In the case of an open ended type mold, the resultant deterioration or damage most generally occurs at the lower end of the mold cavity. In the case of an ingot mold which has an open top end and a closed bottom end, such deterioration occurs adjacent the cavity open top end. In addition, the mold side walls will sometimes prematurely crack and begin to separate. While means have heretofore been devised for repairing such side wall cracks, the molds are generally removed from further production use once the mold cavity begins to round out or otherwise deteriorate as a result of a plurality of ingot casting operations.

It has, therefore, been considered desirable to develop some means for repairing or reconditioning ingot molds for purposes of enhancing or increasing their effective useful lives. Such means would, for example, be advantageous in reducing the frequency with which ingot molds must be replaced, in reducing the necessary inventory of such molds and in reducing storage facilities required therefor.

The present invention contemplates a new and improved process which overcomes the above referred to problems and others and provides a new ingot mold reconditioning process which is simple, economical, readily adapted to use in any number of ingot mold types and styles and which allows a reduction in the volume of an ingot mold in a controlled manner to accommodate various production applications.

BRIEF DESCRIPTION OF THE INVENTION

In accordance with the present invention, there is provided a process for reconditioning an ingot mold following some predetermined period of use for purposes of extending the useful life thereof. Broadly, the process involves machining the ingot mold in a controlled fashion to remove damaged mold areas adjacent the mold cavity open top or bottom end to facilitate further production use.

More particularly, the process is designed for use with an ingot mold of the type having an external peripheral wall with opposed mold top and bottom ends and in internal mold cavity having at least one open end and extending at least substantially between the mold top and bottom ends. The cavity has a predetermined first volume defined by first length dimension extending between cavity ends disposed adjacent the mold top and bottom ends and a predetermined cross-sectional area disposed normal to the first length. The process itself comprises the steps of:

(a) machining the mold at generally the cavity at least one open end transversely of the cavity first length for removing a damaged area of the mold located adjacent the cavity at least one open end; and, (b) controlling the step of machining so that the first length is reduced to some desired second length in order that the cavity will have some predetermined second volume which comprises a reduced multiple of the first volume.

In accordance with another aspect of the invention, the ingot mold defines a mold cavity which is open at both the opposed top and bottom ends thereof and the step of machining is performed at the mold bottom end.

In accordance with another aspect of the invention, the ingot mold defines a mold cavity which is open at the mold top end and closed at the mold bottom end and the step of machining is performed at the mold top end.

According to a further aspect of the present invention, the process includes the step of refurbishing at least the side walls of the cavity so as to have some desired surface characteristics and cavity second cross-sectional area. In the preferred process, the step of refurbishing includes dimensioning this second cross-sectional area to be substantially equal to the cavity first cross-sectional area.

According to yet another aspect of the new process, reconditioning of the ingot mold allows additional slightly smaller ingots to be cast therefrom. The steps of machining and controlling are performed such that the mold cavity second volume will produce an ingot which may be subsequently processed into a lesser number of bars which are substantially equal in dimensional and volume characteristics to bars obtained from an ingot cast from the original mold having the first volume.

The principal object of the present invention is the provision of a new process for reconditioning an ingot mold.

Another object of the invention resides in the provision of such process which is relatively simple and inexpensive to employ.

Still another object of the invention is the provision of an ingot mold reconditioning process which is readily adapted to use with many types and styles of ingot mold designs.

Yet another object of the present invention is the provision of a reconditioning process wherein the volume of an individual ingot mold may be reduced in a controlled manner so that a desired mold cavity volume can be realized for accommodating particular production applications.

Still other objects and advantages for the invention will become apparent to those skilled in the art upon a reading and understanding of the following specification.

BRIEF DESCRIPTION OF THE DRAWINGS

The invention may take physical form in certain parts and arrangements of parts, a preferred and an alternative embodiment of which will be described in detail in the specification and illustrated in the accompanying drawings which form a part hereof and wherein.

DESCRIPTION OF THE PREFERRED AND AN ALTERNATIVE EMBODIMENT

Figure 1:
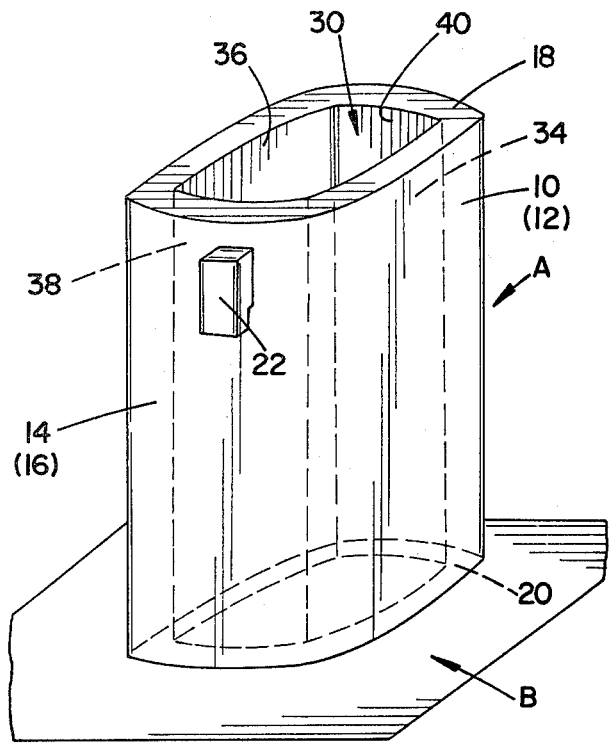
FIG. 1 is a generally perspective and schematic view of a typical open ended mold for casting steel ingots.
Figure 2:
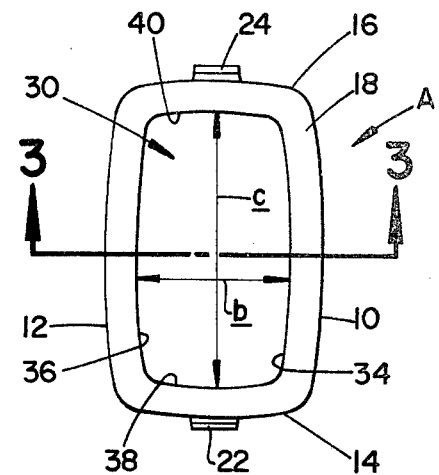
FIG. 2 is a plan view of the mold as shown in FIG. 1.
Figure 3:
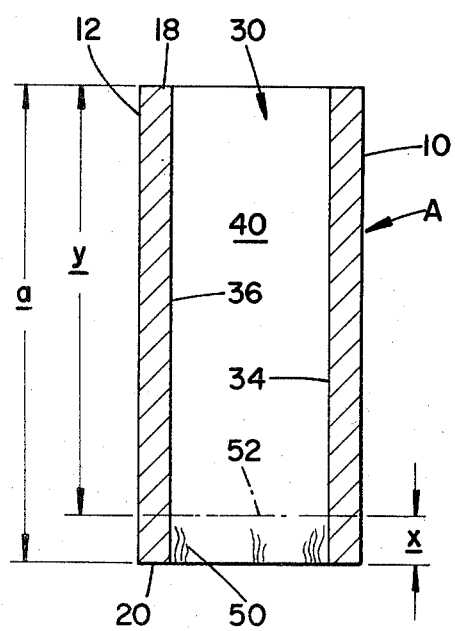
FIG. 3 is a vertical cross-sectional view of the mold taken along lines 3—3 of FIG. 2; and, FIG. 4 is a view similar to FIG. 3 showing adaptation of the process to a so-called closed end ingot mold.

Referring now to the drawings wherein the showings are for purposes of illustrating the preferred and an alternative embodiment of the invention only and not for purposes of limiting same, FIGS. 1-3 show a conventional open end type steel ingot mold A disposed in an upright or vertical position on a planar surface B. Surface B may comprise any convenient pouring surface as is typically utilized in the art and environment of steel ingot production. Steel ingot molds typically have elongated somewhat rectangular configurations with the mold length dimension being generally vertically disposed. While the preferred implementation of the subject reconditioning process is hereinafter described with reference to application on an open ended type ingot mold, it will be appreciated that the process is also applicable to use with other types and styles of such molds. Moreover, it will also be appreciated that the process could be adapted to use in other environments where it is desired to recondition a mold arrangement for purposes of enhancing its useful life.

More particularly, ingot mold A includes a continuous peripheral wall portion defined by opposed side walls 10,12 and opposed end walls 14,16. These walls terminate in a top end or face 18 and a bottom end or face 20 which are opposed to each other. It is this bottom end or face which supports the mold on planar surface B during ingot casting. A pair of lift handles or hooks 22,24 are fixedly secured to end walls 14,16, respectively, to facilitate convenient chain or cable connections for a crane or the like in order that the mold may be moved from one position to another as is deemed necessary and/or appropriate to accommodate ingot casting and subsequent processing.

An open ended mold cavity generally designated 30 in FIGS. 1-3 extends through the mold between mold top and bottom ends 18,20. This cavity also has an elongated somewhat rectangular configuration defined by opposed side walls 34,36 and opposed end walls 38,40. As best shown in FIG. 2, the areas of intersection between adjacent mold cavity side and end walls are slightly radiused to better accommodate the casting process. Moreover, the cavity side and end walls themselves have a slightly arcuate configuration. As originally manufactured, ingot mold A and cavity 30 have a length dimension generally designated a (FIG. 3) extending between the top and bottom ends or faces 18,20. In most ingot mold constructions, the cavity side walls 34,36 and cavity end walls 38,40 taper slightly toward each other over length a from mold top end 18 toward mold bottom end 20. In addition, mold cavity 30 has some predetermined initial cross-sectional area at intervals along length a. In the typical case where the cavity side and end walls taper in the manner previously described, the precise cross-sectional area of the cavity will vary slightly over cavity length a. This cavity cross-sectional area is generally designated FIG. 2 by dimension b extending between cavity side walls 34,36 and by dimension c extending between cavity end walls 38,40. The exemplary cross-sectional dimensions b, c there shown in FIG. 2 are disposed adjacent top end 18 and, again, will normally vary over length a.

Cavity 30 as described hereinabove is designed to have some predetermined volume so that ingots cast therein will, in turn, generally have some predetermined volume. Following casting, the ingot is removed from mold A and then processed through various soaking, rolling and shaping mills for reshaping into some desired configuration as is conventional. Following such reshaping, the ingot is typically cut into a plurality of smaller bars which are substantially identical to each other in dimensional and volume characteristics for subsequent further processing and/or forming. It is normally desired that each ingot yield some predetermined number of such substantially identical bars and generate a minimum of scrap when cut into bar form. Thus, it is deemed advantageous to fairly closely control ingot volume to accommodate the total volume of the predetermined number of bars which are to be obtained therefrom as well as any scrap which must be generated in conventionally processing the ingot.

During the course of use for casting a number of ingots, ingot mold A will become damaged or begin to deteriorate. Ultimately, this damage or deterioration will develop to the point where the mold may no longer be effectively used. In the open end type ingot mold shown in FIGS. 1-3, the deterioration with which the subject reconditioning process is concerned normally occurs in the mold cavity side and end walls adjacent the mold bottom end or face 20. A damaged or deteriorated area of this type is designated by numeral 50 in FIG. 3 and normally develops as edge erosion and round out of the cavity adjacent the mold bottom. Heretofore, when the damage or deterioration reached a point where the mold could no longer be effectively used for ingot production, the mold would be discarded or removed from further production use.

The subject invention, however, provides a process in which the ingot mold may be reconditioned or refurbished and then placed back into production use for enhancing or extending the mold useful life. The process itself is accomplished by cutting off or machining away a portion of the mold which includes the damaged area of the mold cavity, so that, in effect, the mold is made somewhat smaller. In the open end type ingot mold shown in FIG. 3, such cut-off or machining is made inwardly thereinto at bottom end or face 20 and laterally or transversely thereacross by an amount at least sufficient to remove damaged or deteriorated area 50. The cutting or machining may be performed by a so-called cut-off saw or by conventional milling techniques. Since the specific manner of effecting the desired cutting or machining does not itself form a part of the process, the details thereof are not discussed herein.

With continued reference to FIG. 3, the amount of cut-off or machining is shown by the dimension x with the new or second length of the mold and mold cavity being designated by dimension y. Thus, ingot mold A will have a new bottom end or face as is designated 52 in FIG. 3. In addition to removing the area of deterioration 50, the amount of cut-off or machining designated by dimension x is calculated so that the volume of cavity 30 will be reduced by some multiple of the original mold volume. More particularly, when ingots cast from the reconditioned or refurbished mold are subsequently processed in the manner previously described, the ingot will assume a general configuration smilar to processed ingots which were cast from the original mold. However, and since ingots cast from the reconditioned mold have a smaller volume than the original ingots, they will have a length, width or thickness dimension which is less than the corresponding dimension of the original ingots when fully processed in preparation for cutting into bars. The particular length, width or thickness dimension which is controlled to be smaller than the corresponding dimension of the original ingots is dependent upon the manner of cutting the processed ingots into bars. That is, ingots cast from the reconditioned mold are processed so that they may be cut into a lesser number of bars which have the same dimensional and volume characteristics as those bars cut from ingots cast in the original mold. By way of example only, if the original mold could be used to obtain 11 equal bars, it is possible when using the reconditioned mold to obtain a lesser number of equal bars, e.g., 10, having the same length, width and thickness dimensions as the aforementioned 11 bars. Such results allow the reconditioning process to be readily adapted to suit any particular production application.

Again, therefore, the dimension x which represents the amount of cut-off or machining performed on the mold is not only dictated by the desire to remove the area of deterioration 50 at the bottom end of mold cavity 30, but also by the desire to obtain some predetermined volume for ingots cast from the reconditioned mold. This predetermined and smaller volume will then ultimately yield a plurality of bars in the manner described hereinabove. As a result, the amount of such cutting or machining actually will be dependent upon both the amount of mold damage to be removed and the particular further processing to which the ingot will be subjected.

In addition to the above described process steps for reconditioning ingot mold A, it may also be desirable as a further part of the overall process to machine side walls 34,36 and end walls 38,40 of the mold cavity to place them into their original surface condition and special relationships to each other. After some period of use, a certain amount of molten metal may begin to adhere to the cavity side and end walls so that the cavity cross-sectional area of the cavity will become slightly reduced. In such instances, it is deemed desirable to also machine the cavity side walls to remove such material and thereby effectively place them back in their original condition and form. This aspect of the refurbishing process may only be necessary and/or desirable in certain situations which will be dictated by the general condition of the mold cavity itself. However, if such machining is necessary and/or desirable, it may be performed by conventional machining techniques such as milling or the like in a manner suitable for the desired end results.

The subject new process for reconditioning or refurbishing an ingot mold thus allows the mold to have a substantially increased service life. Moreover, the effective service life of the reconditioned mold can exceed the service life of the original mold because of the so-called conditioning process which has occurred from the previous casting operations, i.e., the mold has been seasoned. Reconditioning the original mold for extending mold life is desirable for reducing the frequency with which ingot molds must be replaced, in reducing the inventory of such molds and reducing the storage facilities required therefor.

Still further, and provided the interior of the mold cavity has not severely deteriorated during the service life of the reconditioned mold, it may be possible to recondition the mold a second time by following the same process steps hereinabove described. In that case, the area of edge erosion and round out at bottom wall or end 52 is machined away so that the mold would be shortened still further. In that event, it might also be desirable to remachine the side and end walls of the mold cavity so that they will again have their original surface finish and special relationships to each other.

Figure 4:
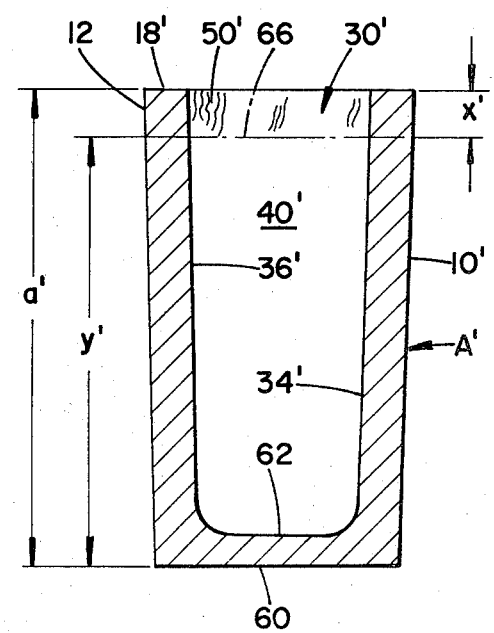

FIG. 4 is similar to FIG. 3 but shows application of the subject process to an ingot mold having a closed bottom end and an open top end. For ease of appreciating and understanding this variation, like components are identified by like numerals with a primed (') suffix and new components are identified by new numerals.

In FIG. 4, ingot mold A' includes a bottom wall 60 with mold cavity 30' thereby similarly including a bottom wall 62. In the closed end type of mold shown in FIG. 4, it is the area of mold cavity 30' generally adjacent mold top end or face 18' which incurs the greatest amount of damage or deterioration during casting. Such deterioration is caused by the casting process itself as well as the means typically required to remove ingots from the mold following casting. To recondition mold A' and increase its service life, a portion of the mold at top end or face 18' is cut off or machined away by an amount equal to dimension x' so that a second length of mold cavity 30' is defined by dimension y' and the mold itself has a new top end or face designated 66. The considerations involved for determining the precise amount of the mold which is cut off or machined away are the same as those hereinabove previously discussed with reference to FIGS. 1-3. Here too, it may be desirable to machine the mold cavity side walls, end walls and bottom wall so that they will be returned to their original surface finish and dimensional characteristics. Thereafter, reconditioned or refurbished ingot mold A' may be placed back into production use.

The process described hereinabove with reference to an open end ingot mold A in FIGS. 1-3 and a closed end mold A' in FIG. 4 enhances effective useful or service life of the molds. This, in turn, facilitates some very substantial overall benefits to and savings in a steel making process. The subject new process is adaptable to many types and styles of steel ingot molds since the problems of mold deterioration are common to all of them. Moreover, as similar problems are encountered in other molding or casting environments, the process is adaptable to use therewith.

The invention has been described with reference to application thereof in preferred and alternative mold constructions. Obviously, modifications and alterations will occur to others upon the reading and understanding of the specification. It is my intention to include all such modifications and alterations insofar as they come within the scope of the appended claims or the equivalents thereof.

Having thus described my invention, I now claim:

1. A process for reconditioning an ingot mold after some predetermined period of use for purposes of extending the useful life thereof wherein said mold is of a type having an external peripheral wall and opposed mold top and bottom ends with an internal mold cavity having at least one open end extending at least substantially between said mold top and bottom ends, said cavity having a predetermined first volume defined by a first length extending between opposed ends of said cavity and a predetermined first cross-sectional area disposed normal to said first length between cavity side walls, said process comprising the steps of:

(a) casting a plurality of first ingots in said mold having approximately said first volume;
   (b) cutting each of said first ingots into a plurality of first bars generally equal to each other;
   (c) machining said mold generally transversely of said first length following casting of a plurality of said first ingots therein for removing an area of mold deterioration adjacent said cavity open end while controlling said machining so that said cavity first length is reduced to some predetermined second length for providing said cavity with a second volume comprising some reduced multiple of said first volume;
   (d) casting a plurality of second ingots having approximately said second volume; and,
   (e) cutting each of said second ingots into a plurality of second bars which are lesser in number and which generally have the same dimensional and volume characteristics as said first bars.

2. The process as defined in claim 1 wherein said ingot mold defines a mold cavity which is open at both the opposed ends thereof, said step of machining being performed from said mold bottom end.

3. The process as defined in claim 1 wherein said ingot mold defines a mold cavity which is open at said mold top end and closed at said mold bottom end, said step of machining being performed from said mold top end.

4. The process as defined in claim 1 further including the step of refurbishing the side walls of said cavity so as to have some predetermined surface finish and second cross-sectional area.

5. The process as defined in claim 4 wherein said step of refurbishing includes dimensioning said second cross-sectional area to be substantially equal to said first cross-sectional area.

6. The process as defined in claim 5 wherein said ingot mold defines a mold cavity which is open at said mold top end and has a closed bottom wall adjacent said mold bottom end, said step of refurbishing further including the step of reshaping said closed bottom wall to have some predetermined configuration.

7. A method for reconditioning an ingot mold after some period of use for purposes of further extending the useful life thereof wherein said mold is of a type having an external peripheral wall and a pair of opposed mold ends with an elongated internal mold cavity extending substantially between said mold ends and including at least one cavity open end at one of said mold ends, said cavity having a first volume defined by a first length dimension measured between opposed cavity ends and a predetermined first cross-sectional area normal to said first length, whereby ingots cast in said mold generally have said first volume and are each subsequently worked and then cut into a predetermined number of first bars which have generally the same dimensional and volume characteristics, said method comprising the steps of:

(a) refurbishing at least the side walls of said cavity for improving the surface finish thereof and for establishing a second cross-sectional area therein which is substantially identical to said first cross-sectional area;
   (b) machining said mold generally transversely of said first length dimension for removing an area of mold deterioration adjacent said cavity open end while controlling said step of machining for causing said first length to be reduced to some predetermined second length where said cavity has some predetermined second volume which comprises some reduced multiple of said first volume; and,
   (c) reusing said ingot mold for casting second ingots having volumes generally equal to said second volume and thereafter working and cutting each of said second ingots into a predetermined number of second bars which are lesser in number and which have the same dimensional and volume characteristics as said first bars.

* * * * *